United States Patent
Hu et al.

(10) Patent No.: US 10,142,971 B2
(45) Date of Patent: Nov. 27, 2018

(54) METHOD AND DEVICE FOR TRANSMITTING DATA

(71) Applicant: Huawei Technologies Co., Ltd., Shenzhen (CN)

(72) Inventors: Zhenxing Hu, Shenzhen (CN); Xiaolong Guo, Shenzhen (CN); Yue Li, Shenzhen (CN); Song Zhu, Shenzhen (CN); Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 747 days.

(21) Appl. No.: 14/555,050

(22) Filed: Nov. 26, 2014

(65) Prior Publication Data

US 2015/0085803 A1 Mar. 26, 2015

Related U.S. Application Data

(63) Continuation of application No. PCT/CN2013/076373, filed on May 29, 2013.

(30) Foreign Application Priority Data

May 29, 2012 (CN) .......................... 2012 1 0171122

(51) Int. Cl.
*H04W 72/04* (2009.01)
*H04W 76/04* (2009.01)
(Continued)

(52) U.S. Cl.
CPC ......... *H04W 72/0413* (2013.01); *H04W 4/20* (2013.01); *H04W 4/90* (2018.02);
(Continued)

(58) Field of Classification Search
CPC . H04W 4/22; H04W 76/046; H04W 72/0413; H04W 72/048
See application file for complete search history.

(56) References Cited

U.S. PATENT DOCUMENTS

2008/0090583 A1\* 4/2008 Wang .................. H04W 72/121
455/452.1
2008/0153454 A1 6/2008 Haapapuro et al.
(Continued)

FOREIGN PATENT DOCUMENTS

CN 1838791 A 9/2006
CN 1909718 A 2/2007
(Continued)

*Primary Examiner* — Romani Ohri
(74) *Attorney, Agent, or Firm* — Leydig, Voit & Mayer, Ltd.

(57) ABSTRACT

The present invention discloses a method and a device for transmitting data, which relate to the field of communications. The method for reporting data transmission includes: when a user equipment UE is electrically powered on, notifying an eNB that the UE has a capability of supporting short latency service, and receiving reporting configuration information transmitted by the eNB; when an short latency service occurs and short latency data corresponding to the short latency service is generated, transmitting, by the UE, the short latency data to the eNB according to the reporting configuration information, or transmitting medium access control layer control elements MAC CE to the eNB according to the reporting configuration information, where the MAC CE includes the short latency data. The device for reporting data transmission includes a notifying module, a receiving module and a transmitting module. The present invention reduces time delay during short latency data transmission.

9 Claims, 7 Drawing Sheets

(51) Int. Cl.
*H04W 8/24* (2009.01)
*H04W 4/20* (2018.01)
*H04W 76/50* (2018.01)
*H04W 4/90* (2018.01)
*H04W 76/27* (2018.01)

(52) U.S. Cl.
CPC ............. *H04W 8/24* (2013.01); *H04W 76/27* (2018.02); *H04W 76/50* (2018.02)

(56) References Cited

U.S. PATENT DOCUMENTS

| | | |
|---|---|---|
| 2009/0163211 A1 | 6/2009 | Kitazoe et al. |
| 2009/0239498 A1 | 9/2009 | Lee et al. |
| 2010/0048161 A1 | 2/2010 | He et al. |
| 2010/0297979 A1 | 11/2010 | Watfa et al. |
| 2011/0069837 A1 | 3/2011 | Song et al. |
| 2011/0176473 A1 | 7/2011 | Schliwa-Bertling et al. |
| 2011/0201324 A1* | 8/2011 | Persson ................. H04W 24/10 455/422.1 |
| 2012/0094627 A1* | 4/2012 | Suh ........................ H04W 4/22 455/404.1 |
| 2012/0129509 A1* | 5/2012 | Chan ................. H04W 52/0216 455/418 |
| 2012/0147830 A1* | 6/2012 | Lohr ................... H04W 72/042 370/329 |
| 2013/0070669 A1* | 3/2013 | Haynes .................. H04W 8/24 370/328 |
| 2013/0308527 A1* | 11/2013 | Chin ................. H04W 36/0022 370/328 |
| 2014/0050185 A1* | 2/2014 | Hooli .................... H04L 5/0053 370/329 |

FOREIGN PATENT DOCUMENTS

| | | |
|---|---|---|
| CN | 101132623 A | 2/2008 |
| CN | 101296509 A | 10/2008 |
| CN | 101577891 A | 11/2009 |
| CN | 101754408 A | 6/2010 |
| EP | 2445236 A1 | 4/2012 |
| WO | WO 2011119680 A2 | 9/2011 |

* cited by examiner

METHOD AND DEVICE FOR TRANSMITTING DATA

CROSS-REFERENCE TO RELATED APPLICATIONS

This application is a continuation application of International Patent Application No. PCT/CN2013/076373, filed on May 29, 2013, which claims priority to Chinese Patent Application No. 201210171122.8, filed on May 29, 2012, both of which are incorporated herein by reference in their entireties.

TECHNICAL FIELD

The present invention relates to the field of communication and, in particular, to a method and a device for transmitting data.

BACKGROUND

The Internet of Things is directed to achieving intelligent interconnection among human, device and system, and is more tremendous than the prevailing Internet, and is widely applied in various fields such as intelligent network systems, intelligent transportation systems, and environmental protection.

Particularly, in the intelligent transportation system, there is a type of service called short latency service, a UE (User Equipment, UE) needs to transmit short latency data, which is generated when an short latency service occurs, to other UEs; for example, when an short latency service occurs and short latency data is generated, a UE1 firstly performs an access process to access to a server at a network side and builds a data channel with the server, and then transmits the short latency data to the server via the data channel, the server then triggers a paging process to page a UE2, which is one of other UEs besides the UE1, after the paging is received, the UE2 performs an access process to access to the server at the network side and builds a data channel with the server, and then transmits the short latency data to the server via the data channel.

The time needed for the UE to perform the access process is relatively long, which makes a time delay for the existing data transmission is so long that requirement for the time delay in the short latency service cannot be satisfied.

SUMMARY

In order to reduce the time delay during short latency data transmission, the present invention provides a method and a device for transmitting data. The technical solutions are described as follows.

One aspect is to provide a method for reporting data transmission, including:

when a user equipment UE is electrically powered on, notifying an eNB (evolved Node B, base station) that the UE has a capability of supporting short latency service, and receiving reporting configuration information transmitted by the eNB;

when an short latency service occurs and short latency data corresponding to the short latency service is generated, transmitting, by the UE, the short latency data to the eNB according to the reporting configuration information, or transmitting medium access control layer control elements MAC CE (Medium Access Control Control Elements, MAC CE) to the eNB according to the reporting configuration information, wherein the MAC CE includes the short latency data.

One aspect is to provide a method for receiving data transmission, including:

when a user equipment UE is electrically powered on, notifying an eNB that the UE has a capability of supporting short latency service, and receiving monitoring configuration information transmitted by the eNB;

monitoring, by the UE, a common channel with an eNB in real time according to the monitoring configuration information;

when the eNB transmits short latency data corresponding to an short latency service via the common channel, receiving, by the UE, the short latency data via the common channel.

One aspect is to provide a method for transmitting data, including:

when a first user equipment UE generates short latency data corresponding to an short latency service, receiving the short latency data transmitted by the first UE via a radio resource control RRC (Radio Resource Control, radio resource control protocol) connection, or receiving medium access control layer control elements MAC CE carrying the short latency data, transmitted by the first UE;

transmitting the short latency data via a common channel with a second UE to the second UE.

One aspect is to provide a device for reporting data transmission, including:

a notifying module, configured to notify an eNB that the UE has a capability of supporting short latency service, when a user equipment UE is electrically powered on;

a receiving module, configured to receive reporting configuration information transmitted by the eNB, after the notifying module notifies the eNB that the UE has the capability of supporting short latency service;

a transmitting module, configured to transmit short latency data to the eNB according to the reporting configuration information received by the receiving module, or transmit medium access control layer control elements MAC CE to the eNB according to the reporting configuration information received by the receiving module, when an short latency service occurs and short latency data corresponding to the short latency service is generated, wherein the MAC CE includes the short latency data.

One aspect is to provide a device for receiving data transmission, including:

a notifying module, configured to notify an eNB that the UE has a capability of supporting short latency service, when a user equipment UE is electrically powered on;

a first receiving module, configured to receive monitoring configuration information transmitted by the eNB, after the notifying module notifies the eNB that the UE has the capability of supporting short latency service;

a monitoring module, configured to monitor a common channel with the eNB in real time according to the monitoring configuration information received by the first receiving module;

a second receiving module, configured to receive the short latency data via the common channel, when the monitoring module monitors that the eNB transmits short latency data corresponding to an short latency service via the common channel.

One aspect is to provide an eNB, including:

a first receiving module, configured to receive the short latency data transmitted by a first user equipment UE via a radio resource control protocol RRC connection, when the first UE generates short latency data corresponding to an short latency service, or receive medium access control layer control elements MAC CE carrying the short latency data, transmitted by the first UE;

a first transmitting module, configured to transmit the short latency data to the second UE via a common channel with the second UE received by the first receiving module.

In embodiments of the present invention, when a UE is electrically powered on, notifying an eNB that the UE has a capability of supporting short latency service, and receiving reporting configuration information transmitted by the eNB; when an short latency service occurs and short latency data corresponding to the short latency service is generated, transmitting, by the UE with the short latency service, the short latency data to the eNB according to the reporting configuration information, or transmitting MAC CE to the eNB according to the reporting configuration information, where the MAC CE includes the short latency data; a UE without an short latency service monitors a common channel with the eNB in real time according to the monitoring configuration information, when the eNB transmits short latency data via the common channel, receiving the short latency data via the common channel. In this way, the UE with the short latency service does not need to access to a server in a network through an access process, but directly transmits short latency data to the eNB according to reporting configuration information, and the UE without the short latency service does not need to access to a server in a network through an access process after receiving the paging, thus can reduce the time delay during short latency data transmission.

DESCRIPTION OF EMBODIMENTS

In order to illustrate objectives, technical solutions, and advantages of the present invention more clearly, embodiments of the present invention will be further described below in detail with reference to the accompanying drawings.

Figure 1:
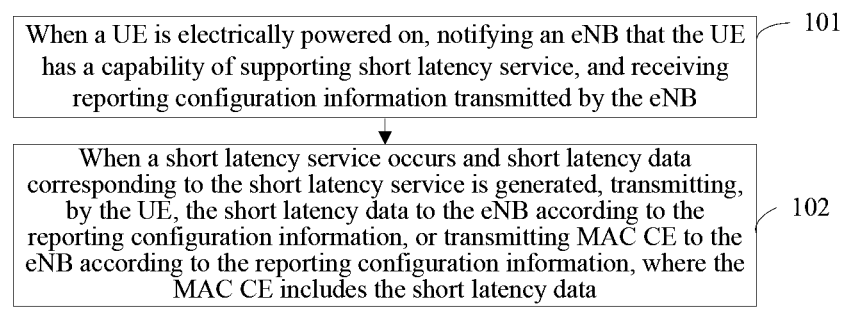
FIG. 1 is a flowchart of a method for reporting data transmission according to an embodiment of the present invention.

Referring to FIG. 1, embodiments of the present invention provide a method for reporting data transmission, including:

Step 101: When a UE is electrically powered on, notifying an eNB that the UE has a capability of supporting short latency service, and receiving reporting configuration information transmitted by the eNB;

Step 102: When an short latency service occurs and short latency data corresponding to the short latency service is generated, transmitting, by the UE, the short latency data to the eNB according to the reporting configuration information, or transmitting MAC CE to the eNB according to the reporting configuration information, where the MAC CE includes the short latency data.

In an embodiment of the present invention, when a UE is electrically powered on, notifying an eNB that the UE has a capability of supporting short latency service, and receiving reporting configuration information transmitted by the eNB; when an short latency service occurs and short latency data corresponding to the short latency service is generated, transmitting, by the UE, the short latency data to the eNB according to the reporting configuration information, or transmitting MAC CE to the eNB according to the reporting configuration information, where the MAC CE includes the short latency data. In this way, the UE with the short latency service does not need to access to a server in a network through an access process, but directly transmits short latency data to the eNB according to reporting configuration information, and thus can reduce the time delay during short latency data reporting.

Figure 2:
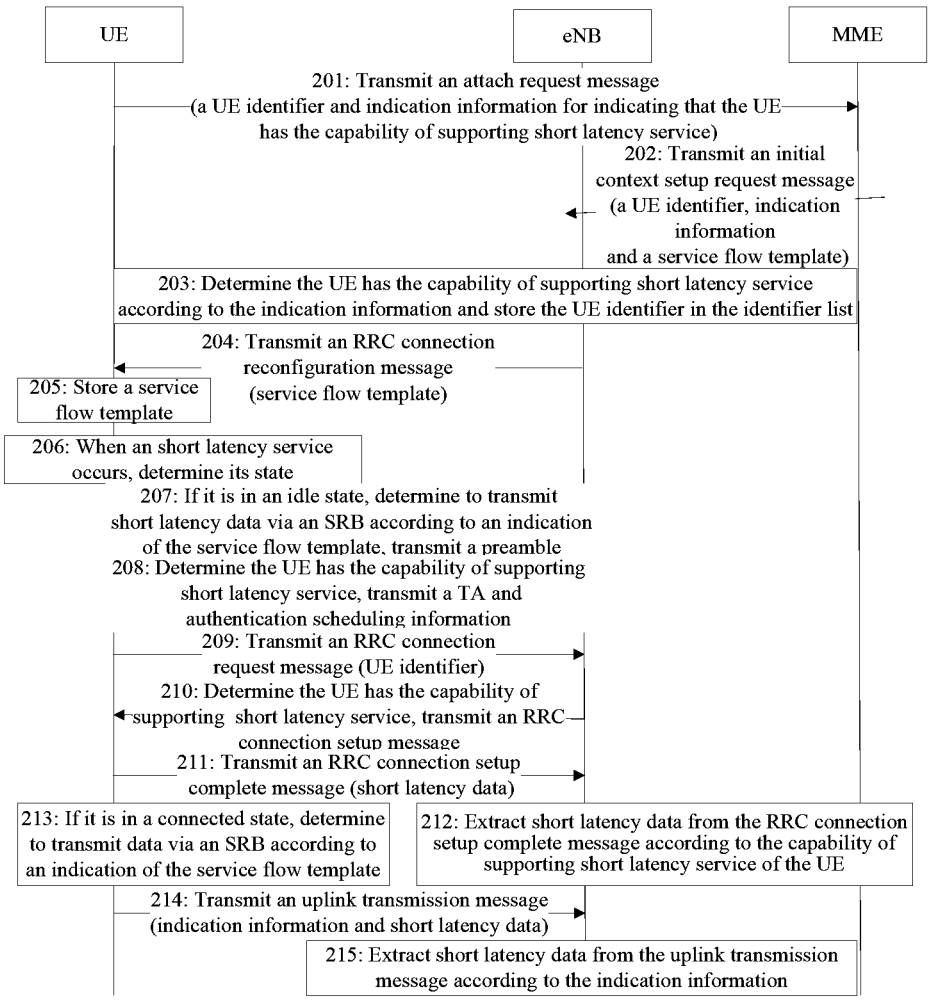
FIG. 2 is a flowchart of a method for reporting data transmission according to another embodiment of the present invention.

Embodiments of the present invention provide a method for reporting data transmission. Particularly, when an short latency service occurs and short latency data is generated, the UE can report the short latency data to the eNB according to the method of this embodiment, referring to FIG. 2, the method includes:

Step 201: After a UE is powered on to access to the eNB, the UE transmits an attach request (Attach Request) message carrying a UE identifier and indication information for indicating that the UE has the capability of supporting short latency service to a mobility management entity (Mobility Management Entity, MME);

After the UE is powered on, it firstly performs an access process to access to the eNB, and then transmits the attach request for requesting to access to a core network to the MME.

Step 202: The MME receives the attach request message, performs authentication and security processes with the UE, and transmits to the eNB an initial context setup request message (Initial Context Setup Request) carrying a UE identifier, indication information for indicating that the UE has the capability of supporting short latency service, and a service flow template corresponding to the short latency service for indicating the UE to transmit short latency data;

In particular, the MME receives the attach request message, determines that the UE has the capability of supporting short latency service according to the indication information for indicating that the UE has the capability of supporting short latency service carried in the attach request message, performs authentication and security processes with the UE, and transmits to the eNB an initial context setup request message carrying a UE identifier, indication information for indicating that the UE has the capability of supporting short latency service, and a service flow template corresponding to the short latency service.

The MME can be configured with the service flow template corresponding to the short latency service in advance.

Step 203: The eNB receives the initial context setup request message carrying a UE identifier stored in an identifier list, indication information for indicating that the UE has the capability of supporting short latency service, and a service flow template corresponding to the short latency service;

In particular, the eNB receives the initial context setup request message carrying a UE identifier stored in an identifier list, indication information for indicating that the UE has the capability of supporting short latency service, and a service flow template corresponding to the short latency service, determines that the UE has the capability of supporting short latency service according to the indication information for indicating that the UE has the capability of supporting short latency service, and stores the UE identifier in the identifier list. The identifier list is used to store an identifier of a UE having the capability of supporting short latency service.

Step 204: The eNB transmits an RRC connection reconfiguration (RRC Connection Reconfiguration) message carrying a service flow template corresponding to the short latency service to the UE;

Further, the RRC connection reconfiguration message also carries a radio network temporary identify (Radio Network Temporary Identify, RNTI) of an short latency service, and configuration information for monitoring a paging channel or discontinuous reception (Discontinuous Reception, DRX) parameter configuration information for monitoring the paging channel.

The eNB can be configured with the service flow template corresponding to the short latency service in advance; correspondingly, the initial context setup request message transmitted by the MME may not carry the service flow template corresponding to the short latency service; the eNB receives the initial context setup request message, acquires its stored service flow template corresponding to the short latency service, and transmits the RRC connection reconfiguration message carrying the acquired service flow template corresponding to the short latency service to the UE.

Further, in this embodiment, when the eNB reports its relevant information to the MME, the MME can configure the service flow template corresponding to the short latency service on the eNB in advance, which particularly is:

The eNB transmits an S1 setup request message to the MME, the MME receives the S1 setup request message, and transmits an S1 setup response message carrying a service flow template corresponding to the short latency service, the eNB receives the S1 setup response message, and stores the service flow template corresponding to the short latency service carried in the S1 setup response message, and thus can achieve configuring the service flow template corresponding to the short latency service in the eNB in advance.

Step 205: The UE receives the RRC connection reconfiguration message, and stores a service flow template corresponding to the short latency service carried in the RRC connection reconfiguration message;

Further, if the RRC connection request message also carries the RNTI of the short latency service, then the UE monitors a physical downlink control channel (Physical Downlink Control Channel, PDCCH) in real time according to the RNTI of the short latency service; if the RRC connection request message also carries configuration information for monitoring a paging channel or DRX parameter configuration information for monitoring the paging channel, then the UE monitors in real time a paging channel with the eNB, according to the configuration information for monitoring the paging channel or the DRX parameter configuration information for monitoring the paging channel.

Step 206: When an short latency service occurs and short latency data is generated, the UE can judge its state;

When an short latency service occurs, an application layer of the UE will generate short latency data; if the UE releases an RRC connection with the eNB, then the UE is in an idle (Idle) state, if there is an RRC connection between the UE and the eNB, then the UE is in a connected state.

Step 207: When the UE is in an idle state, the UE determines to transmit short latency data via an SRB with the eNB, according to an indication of the service flow template corresponding to the short latency service, and transmits a preamble (Preamble) to the eNB;

The UE is in an idle state, that is, the UE has released an RRC connection with the eNB, the UE needs to set up again the RRC connection with the eNB via the preamble; the RRC connection includes a signaling radio bearer (Signaling Radio Bearer, SRB) and a data radio bearer (Data Radio Bearer, DRB).

Step 208: The eNB receives the preamble, and transmits a TA and authentication scheduling information to the UE;

Step 209: The UE receives the TA and the authentication scheduling information, transmits an RRC connection request (RRC Connection Request) message carrying a UE identifier to the eNB;

Step 210: The eNB receives the RRC connection request message, determines that the UE has the capability of supporting short latency service according to the UE identifier and a stored identifier list carried in the RRC connection request message, and transmits an RRC connection setup (RRC Connection Setup) message to the UE;

In particular, the eNB receives the RRC connection request message, judges that the stored identifier list includes a UE identifier according to the UE identifier carried in the RRC connection request message, thereby determines that the UE has the capability of supporting short latency service, and transmits the RRC connection setup message to the UE.

Step 211: The UE receives the RRC connection setup message to set up an SRB with the eNB, transmits an RRC connection setup complete (RRC Connection Setup Complete) message carrying the short latency data to the eNB via the SRB with the eNB;

Step 212: The eNB receives the RRC connection setup complete message, and extracts the short latency data from the RRC connection setup complete message according to the capability of supporting short latency service of the UE;

Since the eNB has determined that the UE has the capability of supporting short latency service, when the RRC connection setup complete message transmitted by the UE is received, the eNB will initiatively check whether the RRC connection setup complete message carries the short latency data or not and extract the short latency data carried in the RRC connection setup complete message.

Step 213: When the UE is in a connected state, the UE determines to transmit short latency data via an SRB with the eNB, according to an indication of the service flow template corresponding to the short latency service;

Step 214: The UE transmits an uplink transmission message carrying indication information and the short latency data to the eNB via the SRB with the eNB;

Step 215: The eNB receives the uplink transmission message via the SRB with the UE, and extracts short latency data from the uplink transmission message according to the indication information carried in the uplink transmission message.

The eNB determines that the uplink transmission message carries the short latency data transmitted to itself according to the indication information carried in the uplink transmission message, and then initiatively extracts the short latency data from the uplink transmission message.

If the UE is in a connected state, the service flow template also can indicate the UE to transmit the short latency data via a DRB with the eNB, which particularly is:

The UE determines to transmit the short latency data via the DRB with the eNB according to an indication of the service flow template corresponding to the short latency service; transmits an uplink data packet carrying the indication information and the short latency data to the eNB via the DRB with the eNB; the eNB receives the uplink data packet via the DRB with the UE, and extracts the short latency data from the uplink data packet according to the indication information carried in the uplink data packet.

The uplink data packet includes a packet header and a data portion, where the packet header can carry indication information while the data portion can carry short latency data.

If the UE is in a connected state, the UE can directly transmit MAC CE carrying indication information and short latency data to the eNB, and the eNB receives the MAC CE, and extracts the short latency data from the MAC CE according to the indication information carried in the MAC CE. A MAC header of the MAC CE can carry indication information.

Further, in this embodiment, when a UE is electrically powered on, the UE receives the RRC connection reconfiguration message transmitted by the eNB, where the RRC connection reconfiguration message also can carry short latency DRB configuration information corresponding to the short latency service, the short latency DRB configuration information includes an short latency DRB identifier, PDCP configuration information, RLC configuration information and short latency logical channel configuration information; when the UE is in a connected state, the service flow template corresponding to the short latency service is used for indicating the UE to transmit short latency data with the short latency DRB;

Correspondingly, when the UE sets up an RRC connection with the eNB, the UE also can set up an short latency DRB with the eNB according to the short latency DRB configuration information corresponding to the short latency service; when an short latency service occurs and short latency data is generated, the UE in the connected state determines to transmit short latency data with the short latency DRB according to an indication of an short latency service flow template, and then transmits the short latency data to the eNB via the short latency DRB with the eNB; the eNB directly receives the short latency data from the short latency DRB.

In an embodiment of the present invention, when a UE is electrically powered on, the UE notifies an eNB that the UE itself has a capability of supporting short latency service, then the eNB transmits an RRC connection reconfiguration message carrying a service flow template corresponding to an short latency service to the UE, when short latency data is generated, if the UE is in an idle state, the UE determines to transmit the short latency data via an SRB with the eNB according to an indication of the service flow template corresponding to the short latency service, sets up an SRB with the eNB, transmits an RRC connection setup complete message carrying the short latency data to the eNB via the SRB, when the UE is in a connected state, the UE transmits the short latency data to the eNB via an SRB or a DRB with the eNB, and accordingly, when an short latency service occurs, the short latency data is transmitted to the eNB via the SRB or the DRB with the eNB, which does not need to access to a server in a network through an access process and thus reducing the time delay during short latency data reporting.

Figure 3:
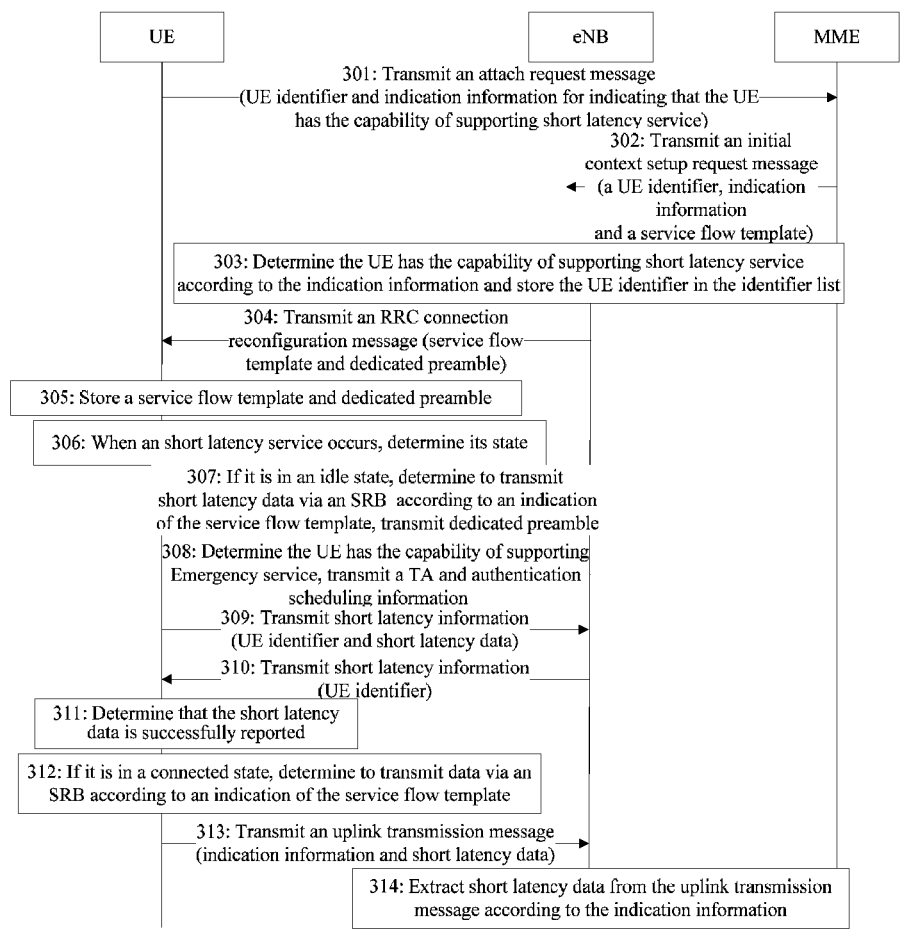
FIG. 3 is a flowchart of a method for reporting data transmission according to another embodiment of the present invention.

Embodiments of the present invention provide a method for reporting data transmission. Particularly, when an short latency service occurs and short latency data is generated, the UE can report the short latency data to a network side according to the method of this embodiment, referring to FIG. 3, the method includes:

Steps 301-303 are the same with steps 201-203 respectively, and will not be described in detail here.

Step 304: The eNB transmits an RRC connection reconfiguration message carrying a service flow template corresponding to an short latency service and a dedicated preamble corresponding to the short latency service to the UE, where the dedicated preamble is used for transmitting short latency data corresponding to the short latency service;

The dedicated preamble is configured in the eNB in advance.

Further, the RRC connection reconfiguration message also carries an RNTI of an short latency service and configuration information for monitoring a paging channel or DRX parameter configuration information for monitoring the paging channel.

The eNB can be configured with the service flow template corresponding to the short latency service in advance; correspondingly, the initial context setup request message transmitted by the MME may not carry the service flow template of the short latency service; the eNB receives the initial context setup request message, then acquires its stored service flow template corresponding to the short latency service, and transmits the RRC connection reconfiguration message carrying the acquired service flow template corresponding to the short latency service to the UE.

Further, in this embodiment, when the eNB reports its relevant information to the MME, the MME can configure the service flow template corresponding to the short latency service on the eNB in advance, which particularly is:

The eNB transmits an S1 setup request message to the MME, the MME receives the S1 setup request message, and transmits an S1 setup response message carrying a service flow template corresponding to the short latency service, the eNB receives the S1 setup response message, and stores the service flow template corresponding to the short latency service carried in the S1 setup response message, and thus can achieve configuring the service flow template corresponding to the short latency service in the eNB in advance.

Step 305: The UE receives the RRC connection reconfiguration message, and stores a service flow template and a dedicated preamble corresponding to the short latency service carried in the RRC connection reconfiguration message;

Further, the RRC connection reconfiguration message also carries an RNTI of an short latency service and configuration information for monitoring a paging channel or DRX parameter configuration information for monitoring the paging channel.

Step 306: When an short latency service occurs and short latency data is generated, the UE judges its state;

When an short latency service occurs, an application layer of the UE will generate short latency data; if the UE releases an RRC connection with the eNB, then the UE is in an idle state, if there is an RRC connection between the UE and the eNB, then the UE is in a connected state.

Step 307: When the UE is in an idle state, the UE determines to transmit short latency data via an SRB with the eNB according to an indication of the service flow template corresponding to the short latency service, and transmits a dedicated preamble corresponding to the short latency service to the eNB;

Step 308: The eNB receives the dedicated preamble, determines that the UE has the capability of supporting short latency service, and transmits a TA and authentication scheduling information to the UE;

Step 309: The UE receives the TA and the authentication scheduling information, transmits short latency information carrying a UE identifier and short latency data to the eNB via an SRB0 included in the RRC connection with the eNB;

When the UE is in an idle state, the UE releases an RRC connection with the eNB, but the SRB0 included in the RRC connection between the UE and the eNB always exists.

Step 310: The eNB receives the short latency information, extracts the short latency data and the UE identifier included in the short latency information according to the capability of supporting short latency service of the UE, transmits an short latency response message carrying the UE identifier to the UE;

Since the eNB has determined that the UE has the capability of supporting short latency service, when the short latency message transmitted by the UE is received, the eNB will initiatively check whether the short latency message carries short latency data or not and extract the short latency data carried in the short latency message.

Step 311: The UE receives the short latency response message, judges that the UE identifier carried in the short latency response message is its identifier, and determines that the short latency data is successfully reported.

Further, in this embodiment, after the TA and the authentication scheduling information transmitted by the eNB are received, the UE transmits an RRC connection request message carrying the UE identifier and the short latency data to the eNB; the eNB receives the RRC connection request message, extracts the UE identifier and the short latency data carried in the RRC connection request message according to the capability of supporting short latency service of the UE, and transmits an RRC connection setup message carrying the UE identifier to the UE; the UE receives the RRC connection setup message, judges that the UE identifier carried in the RRC connection setup message is its identifier, and determines that the short latency data is successfully reported.

Step 312: When the UE is in a connected state, the UE determines to transmit short latency data via an SRB with the eNB according to an indication of the service flow template corresponding to the short latency service;

Step 313: The UE transmits an uplink transmission message carrying indication information and the short latency data to the eNB via the SRB with the eNB;

Step 314: The eNB receives the uplink transmission message via the SRB with the UE, and extracts the short latency data from the uplink transmission message according to the indication information carried in the uplink transmission message.

The eNB determines that the uplink transmission message carries the short latency data transmitted to itself according to the indication information carried in the uplink transmission message, and then initiatively extracts the short latency data from the uplink transmission message.

If the UE is in a connected state, the service flow template also can indicate the UE to transmit short latency data via a DRB with the eNB, which particularly is:

The UE determines to transmit the short latency data via the DRB with the eNB according to an indication of the service flow template corresponding to the short latency service; transmits an uplink data packet carrying the indication information and the short latency data to the eNB via the DRB with the eNB; the eNB receives the uplink data packet via the DRB with the UE, and extracts the short latency data from the uplink data packet according to the indication information carried in the uplink data packet.

The uplink data packet includes a packet header and a data portion, where the packet header can carry indication information while the data portion can carry short latency data.

If the UE is in a connected state, the UE can directly transmit MAC CE carrying the indication information and the short latency data to the eNB, and the eNB receives the MAC CE, and extracts the short latency data from the MAC CE according to the indication information carried in the MAC CE. A MAC header of the MAC CE can carry indication information.

Further, in this embodiment, when a UE is electrically powered on, the UE receives the RRC connection reconfiguration message transmitted by the eNB, where the RRC connection reconfiguration message can also carry short latency DRB configuration information corresponding to the short latency service, the short latency DRB configuration information includes an short latency DRB identifier, PDCP configuration information, RLC configuration information and short latency logical channel configuration information; the service flow template corresponding to the short latency service is used for indicating the UE to transmit short latency data with the short latency DRB;

Correspondingly, when the UE sets up an RRC connection with the eNB, the UE sets up an short latency DRB with the eNB according to the short latency DRB configuration information corresponding to the short latency service; when an short latency service occurs and short latency data is generated, the UE in the connected state determines to transmit short latency data with the short latency DRB according to an indication of an short latency service flow template, and then transmits the short latency data to the eNB via the short latency DRB with the eNB; the eNB directly receives the short latency data from the short latency DRB.

In an embodiment of the present invention, when a UE is electrically powered on, the UE notifies an eNB that the UE itself has a capability of supporting short latency service, then the eNB transmits an RRC connection reconfiguration message carrying a service flow template and a dedicated preamble corresponding to an short latency service to the UE, when short latency data is generated, if the UE is in an idle state, the UE determines to transmit the short latency data via an SRB with the eNB according to an indication of the service flow template corresponding to the short latency service, transmits short latency information carrying the short latency data via an SRB0, when the UE is in a connected state, the UE transmits the short latency data to the eNB via an SRB or a DRB with the eNB, and accordingly, when an short latency service occurs, there is no need to access to a server in a network through an access process but only to transmit the short latency data to the eNB via the SRB or the DRB with the eNB, thus reducing the time delay during short latency data reporting.

Figure 4:
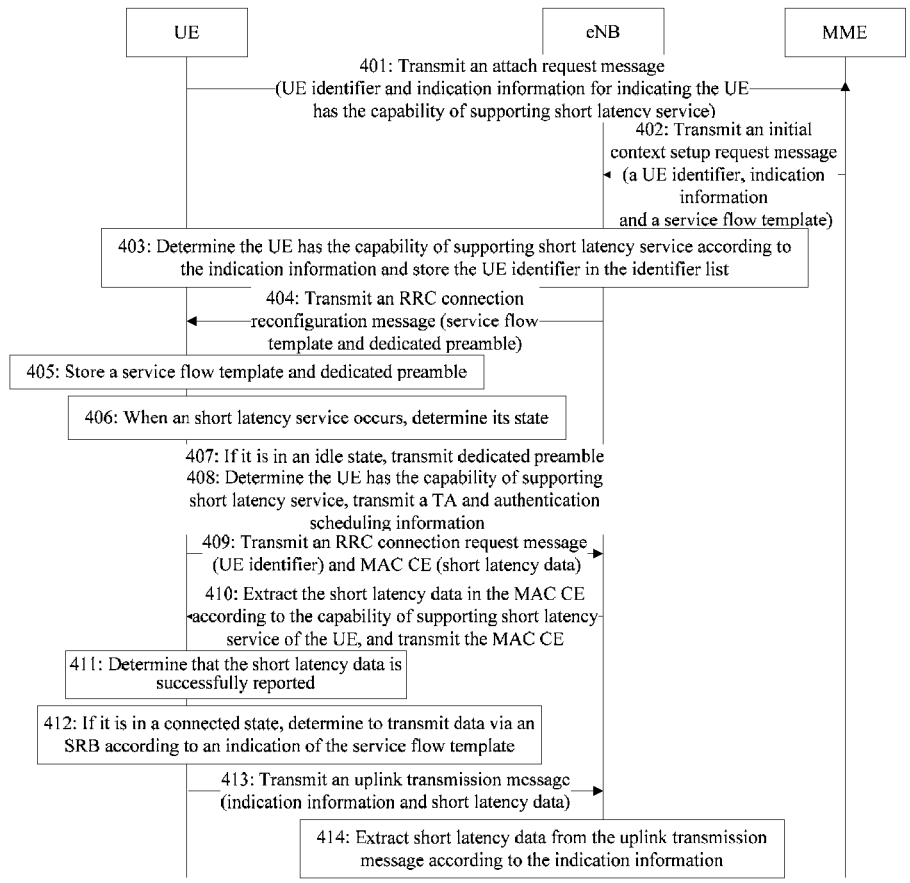
FIG. 4 is a flowchart of a method for reporting data transmission according to another embodiment of the present invention.

Embodiments of the present invention provide a method for reporting data transmission. Particularly, when an short latency service occurs and short latency data is generated, the UE can report the short latency data to a network side according to the method of this embodiment, referring to FIG. 4, the method includes:

Steps 401-405 are the same with steps 301-305 respectively, and will not be described in detail here.

Step 406: When an short latency service occurs and short latency data is generated, the UE judges its state;

When an short latency service occurs, an application layer of the UE will generate short latency data; if the UE releases an RRC connection with the eNB, then the UE is in an idle state, if there is an RRC connection between the UE and the eNB, then the UE is in a connected state.

Step 407: If the UE is in an idle state, the UE transmits a dedicated preamble corresponding to the short latency service to the eNB;

Step 408: The eNB receives the dedicated preamble, determines that the UE needs to transmit short latency data, and transmits a TA and authentication scheduling information to the UE;

Step 409: The UE receives the TA and the authentication scheduling information, transmits an RRC connection request message carrying a UE identifier and MAC CE carrying the short latency data to the eNB;

Step 410: The eNB receives the RRC connection request message and the MAC CE, extracts the UE identifier carried in the RRC connection request message and the short latency data carried in the MAC CE according to the capability of supporting short latency service of the UE, and transmits the MAC CE carrying the UE identifier to the UE;

Since the eNB has determined that the UE has the capability of supporting short latency service, when the MAC CE is received, the eNB will initiatively check whether the MAC CE includes the short latency data transmitted to itself, and extracts the short latency data from the MAC CE.

Step 411: The UE receives the MAC CE, judges that the UE identifier carried in the MAC CE is its identifier, and determines that the short latency data is successfully reported.

Step 412: When the UE is in a connected state, the UE determines to transmit short latency data via an SRB with the eNB according to an indication of the service flow template corresponding to the short latency service;

Step 413: The UE transmits an uplink transmission message carrying indication information and the short latency data to the eNB via the SRB with the eNB.

Step 414: The eNB receives the uplink transmission message via the SRB with the UE, and extracts the short latency data from the uplink transmission message according to the indication information carried in the uplink transmission message.

The eNB determines that the uplink transmission message carries the short latency data transmitted to itself according to the indication information carried in the uplink transmission message, and then initiatively extracts the short latency data from the uplink transmission message.

If the UE is in a connected state, the service flow template can also indicate the UE to transmit short latency data via a DRB with the eNB, which particularly is:

The UE determines to transmit the short latency data via the DRB with the eNB according to an indication of the service flow template corresponding to the short latency service; transmits an uplink data packet carrying the indication information and the short latency data to the eNB via the DRB with the eNB; the eNB receives the uplink data packet via the DRB with the UE, and extracts the short latency data from the uplink data packet according to the indication information carried in the uplink data packet.

The uplink data packet includes a packet header and a data portion, where the packet header can carry indication information while the data portion can carry short latency data.

If the UE is in a connected state, the UE can directly transmit MAC CE carrying indication information and the short latency data to the eNB, and the eNB receives the MAC CE, and extracts the short latency data from the MAC CE according to the indication information carried in the MAC CE. A MAC header of the MAC CE can carry indication information.

Further, in this embodiment, when a UE is electrically powered on, the UE receives an RRC connection reconfiguration message transmitted by the eNB, where the RRC connection reconfiguration message can also carry short latency DRB configuration information corresponding to the short latency service, the short latency DRB configuration information includes an short latency DRB identifier, PDCP configuration information, RLC configuration information and short latency logical channel configuration information; the service flow template corresponding to the short latency service is used for indicating the UE to transmit short latency data with the short latency DRB;

Correspondingly, when the UE sets up an RRC connection with the eNB, the UE sets up an short latency DRB with the eNB according to the short latency DRB configuration information corresponding to the short latency service; when an short latency service occurs and short latency data is generated, the UE in the connected state determines to transmit short latency data with the short latency DRB according to an indication of the short latency service flow template, and then transmits the short latency data to the eNB via the short latency DRB with the eNB; the eNB directly receives the short latency data from the short latency DRB.

In embodiments of the present invention, when a UE is electrically powered on, the UE notifies an eNB that the UE itself has a capability of supporting short latency service, then the eNB transmits an RRC connection reconfiguration message carrying a service flow template and a dedicated preamble corresponding to an short latency service to the UE, when short latency data is generated, if the UE is in an idle state, the UE can transmit the MAC CE carrying the short latency data to the eNB, when the UE is in a connected state, the UE transmits the short latency data to the eNB via an SRB or a DRB with the eNB, and accordingly, when an short latency service occurs, the short latency data is transmitted to the eNB via the SRB or the DRB with the eNB, thus reducing the time delay during short latency data reporting.

Figure 5:
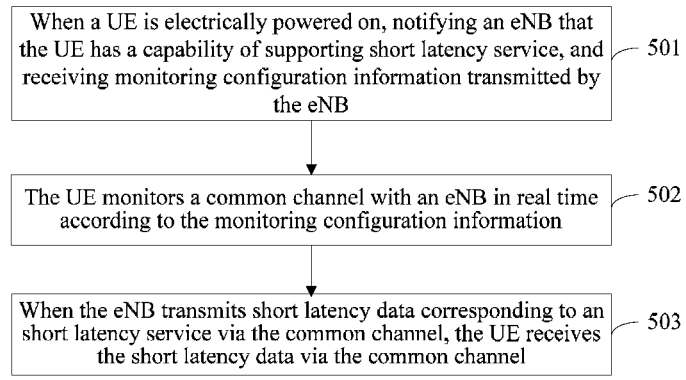
FIG. 5 is a flowchart of a method for receiving data transmission according to another embodiment of the present invention.

Referring to FIG. 5, embodiments of the present invention provide a method for receiving data transmission, including:

Step 501: When a UE is electrically powered on, notifying an eNB that the UE has a capability of supporting short latency service, and receiving monitoring configuration information transmitted by the eNB;

Step 502: The UE monitors a common channel with the eNB in real time according to the monitoring configuration information;

Step 503: When the eNB transmits short latency data corresponding to an short latency service via the common channel, the UE receives the short latency data via the common channel.

In an embodiment of the present invention, when a UE is electrically powered on, the UE notifies an eNB that the UE has a capability of supporting short latency service, receives the monitoring configuration information transmitted by the eNB, and monitors the common channel with the eNB in real time according to the monitoring configuration information, when the eNB transmits short latency data corresponding to an short latency service via the common channel, the UE receives the short latency data via the common channel. Accordingly, when short latency data at a network side needs to be transmitted to the UE, the common channel is directly monitored according to the monitoring configuration information, which does not need to page the UE first and then the UE accesses to a server in a network through an access, when monitored that the eNB transmits short latency data via the common channel, the short latency data is received via the common channel, thus reducing the time delay during short latency data reception.

Figure 6:
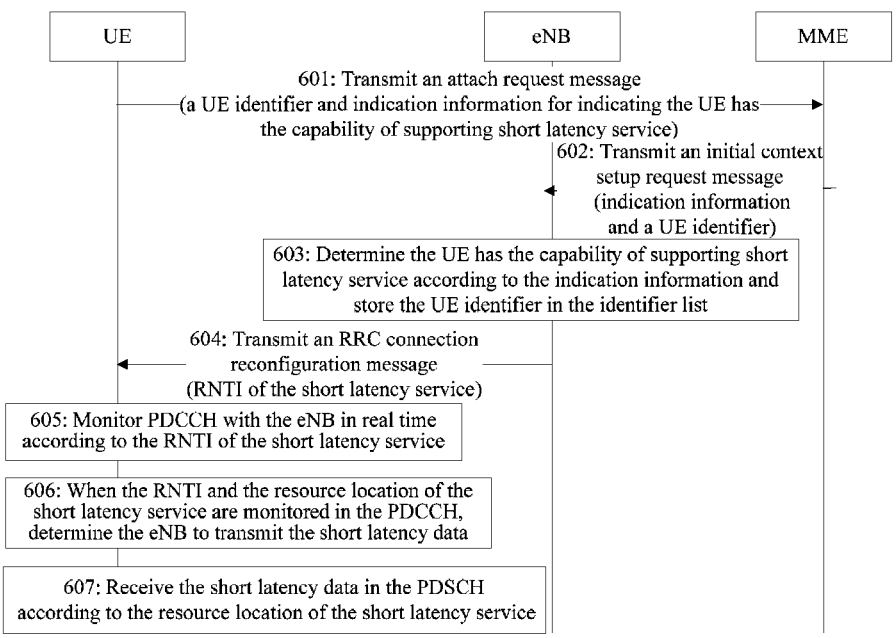
FIG. 6 is a flowchart of a method for receiving data transmission according to another embodiment of the present invention.

Embodiments of the present invention provide a method for receiving data transmission. When the eNB receives the short latency data with the above method for reporting data transmission, and the eNB can issue the received short latency data to the UE according to the method provided in the embodiments of the present invention, referring to FIG. 6, the method includes:

Step 601: After a UE is electrically powered on to access to the eNB, the UE transmits an attach request message carrying a UE identifier and indication information for indicating that the UE has the capability of supporting short latency service to an MME;

After the UE is electrically powered on, it firstly performs an access process to access to the eNB, and then transmits the attach request for requesting to access to a core network to the MME.

Step 602: The MME receives the attach request message, performs authentication and security processes with the UE, and transmits to the eNB an initial context setup request message carrying the UE identifier and indication information for indicating that the UE has the capability of supporting short latency service;

In particular, the MME receives the attach request message, determines that the UE has the capability of supporting short latency service according to the indication information for indicating that the UE has the capability of supporting short latency service carried in the attach request message, performs authentication and security processes with the UE, and transmits to the eNB an initial context setup request message carrying the UE identifier and indication information for indicating that the UE has the capability of supporting short latency service.

Further, the initial context setup request message also carries a service flow template corresponding to an short latency service.

Step 603: The eNB receives the initial context setup request message, and stores the initial context setup request message in an identifier list;

In particular, the eNB receives the initial context setup request message, determines that the UE has the capability of supporting short latency service according to the indication information for indicating that the UE has the capability of supporting short latency service carried in the initial context setup request message, and stores the UE identifier in the identifier list. The identifier list is used to store an identifier of a UE having the capability of supporting short latency service.

Step 604: The eNB transmits an RRC connection reconfiguration message carrying an RNTI of the short latency service to the UE;

Further, the RRC connection reconfiguration message also carries reporting configuration information including a service flow template corresponding to an short latency service, a dedicated preamble corresponding to the short latency service and/or short latency DRB configuration information.

Step 605: The UE receives the RRC connection reconfiguration message, extracts the RNTI of the short latency service carried in the RRC connection reconfiguration message, and monitors a PDCCH in real time according to the RNTI of the short latency service;

Further, the UE extracts the service flow template corresponding to the short latency service, the short latency DRB configuration information corresponding to the short latency service and/or the dedicated preamble corresponding to the short latency service carried in the RRC connection reconfiguration message, and stores the service flow template corresponding to the short latency service, the short latency DRB configuration information corresponding to the short latency service and/or the dedicated preamble corresponding to the short latency service.

When the eNB receives short latency data reported by other UE in the network using the above method for reporting data transmission, then transmits an RNTI of the short latency service and a resource location of the short latency service in the PDCCH to the UE to schedule the UE, and then transmits the short latency data to the UE in a physical downlink shared channel (Physical Downlink Shared Channel, PDSCH) according to the resource location of the short latency service.

Step 606: When the UE monitors the RNTI of the short latency service and the resource location of the short latency service in the PDCCH transmitted by the eNB, determines that the eNB transmits the short latency data;

Step 607: The UE receives the short latency data transmitted by the eNB according to the resource location of the short latency service in the PDSCH with the eNB.

In this embodiment, an short latency logical channel corresponding to the short latency service is configured in MAC layer of the UE in advance, where the short latency logical channel corresponds to the short latency DRB with the RRC layer one by one; when the UE receives short latency data from a physical layer PDSCH, transmits the short latency data to a DL-SCH, and then the DL-SCH transmits the short latency data to the short latency logical channel of the MAC layer, and transmits the short latency data to the short latency DRB of the RRC layer via the short latency logical channel, transmits the short latency data to an application layer of the UE via the short latency DRB, and displays the short latency data to a user on the application layer of the UE.

In this embodiment, an MAC control module is configured in MAC layer of the UE in advance, where the MAC control module corresponds to the short latency DRB with the RRC layer one by one; when the UE receives short latency data from a physical layer PDSCH, transmits the short latency data to a DL-SCH, and then the DL-SCH transmits the short latency data to the MAC control module of the MAC layer, and transmits the short latency data to the short latency DRB of the RRC layer via the short latency logical channel, transmits the short latency data to an application layer of the UE via the short latency DRB, and displays the short latency data to a user on the application layer of the UE.

In embodiments of the present invention, when a UE is electrically powered on, the UE notifies an eNB that the UE itself has a capability of supporting short latency service, receives an RRC connection reconfiguration message carrying an RNTI of the short latency service transmitted by the eNB, monitors in real time a PDCCH with the eNB according to the RNTI of the short latency service, when the RNTI and a resource location of the short latency service transmitted by the eNB via the PDCCH are monitored, receives the short latency data transmitted by the eNB according to the resource location in the PDSCH, and thus reducing the time delay during short latency data reception.

Figure 7:
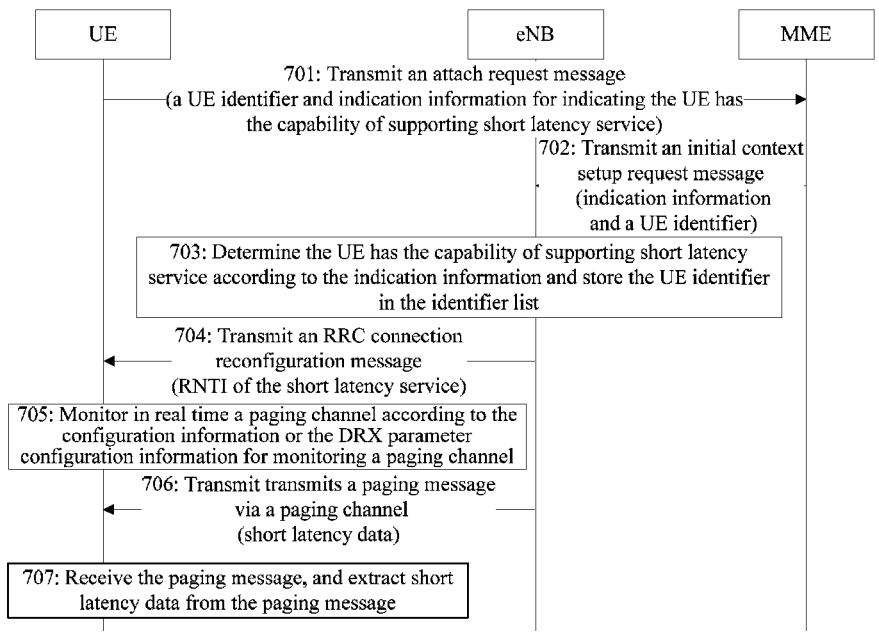
FIG. 7 is a flowchart of a method for receiving data transmission according to another embodiment of the present invention.

Embodiments of the present invention provide a method for receiving data transmission. When the eNB receives the short latency data with the above method for reporting data transmission, the eNB can issue the received short latency data to the UE according to the method provided in the embodiments of the present invention, referring to FIG. 7, the method includes:

Steps 701-703 are the same with steps 601-603 respectively, and will not be described in detail here.

Step 704: The eNB transmits an RRC connection reconfiguration message carrying configuration information for monitoring a paging channel or DRX parameter configuration information for monitoring the paging channel to the UE;

Further, the RRC connection reconfiguration message also carries reporting configuration information carrying a service flow template corresponding to an short latency service, a dedicated preamble corresponding to the short latency service and/or short latency DRB configuration information.

Step 705: The UE receives the RRC connection reconfiguration message, and monitors in real time a paging channel according to the configuration information for monitoring the paging channel or the DRX parameter configuration information for monitoring the paging channel carried in the RRC connection reconfiguration message;

After the UE is powered on, a paging channel with the eNB is set up, and which will always exist.

Further, the UE extracts the reporting configuration information carried in the RRC connection reconfiguration message, and stores the reporting configuration information.

Step 706: When short latency data is received, the eNB transmits a paging message carrying the short latency data to the UE via a paging channel with the UE;

The eNB receives the short latency data reported by other UE in the network with the above method for reporting data transmission.

Step 707: When a paging message transmitted by the eNB on the paging channel is monitored, the UE receives the paging message, and extracts the short latency data from the paging message.

In embodiments of the present invention, when a UE is electrically powered on, the UE notifies an eNB that the UE itself has a capability of supporting short latency service, receives an RRC connection reconfiguration message carrying configuration information for monitoring a paging channel or DRX parameter configuration information for monitoring the paging channel transmitted by the eNB, monitors in real time a paging channel with the eNB according to the configuration information for monitoring a paging channel or the DRX parameter configuration information for monitoring the paging channel, when a paging message carrying short latency data transmitted by the eNB on the paging channel is monitored, the UE receives the paging message, extracts the short latency data from the paging message, thus reducing the time delay during short latency data reception.

Figure 8:
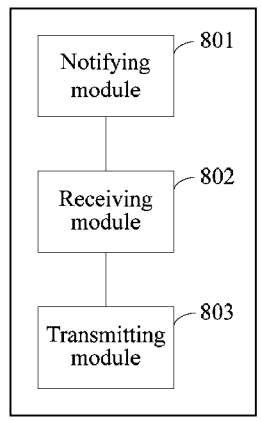
FIG. 8 is a schematic structural diagram of a device for reporting data transmission according to another embodiment of the present invention.

Referring to FIG. 8, embodiments of the present invention provide a device for reporting data transmission, including:

a notifying module 801, configured to notify an eNB that the UE has a capability of supporting short latency service, when a UE is electrically powered on;

a receiving module 802, configured to receive reporting configuration information transmitted by the eNB, after the notifying module 801 notifies the eNB that the UE has the capability of supporting short latency service;

a transmitting module 803, configured to transmit short latency data to the eNB according to the reporting configuration information received by the receiving module 802, or transmit MAC CE to the eNB according to the reporting configuration information received by the receiving module 802, when an short latency service occurs and the short latency data corresponding to the short latency service is generated, where the MAC CE includes the short latency data.

The notifying module 801 is specifically configured to transmit a UE identifier and indication information for indicating that the UE has the capability of supporting short latency service to the eNB, so that the eNB determines that the UE has the capability of supporting short latency service;

The receiving module 802 is specifically configured to receive an RRC connection reconfiguration message carrying the reporting configuration information, transmitted by the eNB, wherein the reporting configuration information includes a service flow template corresponding to the short latency service and/or a dedicated preamble corresponding to the short latency service.

The transmitting module 803 includes:

a first determining unit, configured to determine that the short latency data is to be transmitted via an SRB with the eNB, when the UE is in an idle state, and the reporting configuration information includes a service flow template corresponding to the short latency service;

a first setup unit, configured to transmit the UE identifier to the eNB, so that the eNB determines that the UE has the capability of supporting short latency service according to the UE identifier, and set up the SRB with the eNB determined by the first determining unit;

a first transmitting unit, configured to transmit an RRC connection setup complete message carrying the short latency data to the eNB via the SRB set up by the first setup unit, so that the eNB extracts the short latency data from the RRC connection setup complete message according to the capability of supporting short latency service of the UE.

The transmitting module 803 includes:

a second determining unit, configured to determine that the short latency data is to be transmitted via an SRB with the eNB according to an indication of a service flow template of the short latency service, when the UE is in an idle state, and the reporting configuration information includes a service flow template corresponding to the short latency service and a dedicated preamble corresponding to the short latency service;

a second transmitting unit, configured to transmit the dedicated preamble corresponding to the short latency service to the eNB, so that the eNB determines that the UE has the capability of supporting short latency service according to the dedicated preamble, and receive a TA and authentication scheduling information transmitted by the eNB, after the second determining unit determined that the short latency data is to be transmitted via the SRB with the eNB;

a third transmitting unit, configured to transmit an short latency message carrying the short latency data to the eNB via an SRB0 with the eNB, after the third transmitting unit received the TA and the authentication scheduling information, so that the eNB extracts the short latency data from the short latency message according to the capability of supporting short latency service of the UE.

The transmitting module 803 includes:

a third determining unit, configured to determine that the short latency data is to be transmitted via an SRB with the eNB according to an indication of a service flow template of the short latency service, when the UE is in an idle state, and the reporting configuration information includes a service flow template corresponding to the short latency service and a dedicated preamble corresponding to the short latency service;

a fourth transmitting unit, configured to transmit the dedicated preamble corresponding to the short latency service to the eNB, so that the eNB determines that the UE has the capability of supporting short latency service according to the dedicated preamble, and receive a TA and authentication scheduling information transmitted by the eNB, after the third determining unit determined that the short latency data is to be transmitted via the SRB with the eNB;

a fifth transmitting unit, configured to transmit an RRC connection request message carrying the short latency data to the eNB via an SRB0 with the eNB, after the fourth transmitting unit received the TA and the authentication scheduling information transmitted by the eNB, so that the eNB extracts the short latency data from the RRC connection request message according to the capability of supporting short latency service of the UE.

The transmitting module 803 includes:

a sixth transmitting unit, configured to transmit a dedicated preamble corresponding to the short latency service to the eNB, so that the eNB determines the UE has the capability of supporting short latency service according to the dedicated preamble, and receive a TA and authentication scheduling information transmitted by the eNB, when the UE is in an idle state, and the reporting configuration information includes the dedicated preamble corresponding to the short latency service;

a seventh transmitting unit, configured to transmit MAC CE carrying the short latency data to the eNB, after the sixth transmitting unit receives the TA and the authentication scheduling information, so that the eNB extracts the short latency data from the MAC CE according to the capability of supporting short latency service of the UE.

The transmitting module 803 includes:

a first determining and transmitting unit, configured to determine that the short latency data is to be transmitted via an SRB with the eNB according to an indication of a service flow template corresponding to the short latency service, when the UE is in a connected state, and the reporting configuration information includes the service flow template corresponding to the short latency service, and transmit an uplink transmission message carrying indication information and the short latency data to the eNB via the SRB with the eNB, so that the eNB extracts the short latency data from the uplink transmission message according to the indication information; or a second determining and transmitting unit, configured to determine that the short latency data is to be transmitted via a DRB with the eNB according to an indication of a service flow template corresponding to the short latency service, when the UE is in a connected state, and the reporting configuration information includes the service flow template corresponding to the short latency service, and transmit an uplink data packet carrying indication information and short latency data to the eNB via the DRB with the eNB, so that the eNB extracts the short latency data from the uplink data packet according to the indication information; or a third determining and transmitting unit, configured to determine that the short latency data is to be transmitted via an short latency DRB corresponding to the short latency service, according to an indication of a service flow template corresponding to the short latency service, when the UE is in a connected state, and the reporting configuration information includes the service flow template corresponding to the short latency service, and transmit the short latency data via the short latency DRB corresponding to the short latency service, that is, the DRB between the UE and the eNB.

Further, the reporting configuration information further includes short latency DRB configuration information corresponding to the short latency service, the device further includes:

a setup module, configured to set up an short latency DRB with the eNB, according to the short latency DRB configuration information corresponding to the short latency service, when the UE sets up an RRC connection with the eNB.

The transmitting module 803 is specifically configured to transmit MAC CE carrying indication information and the short latency data to the eNB, when the UE is in a connected state, so that the eNB extracts the short latency data from the MAC CE according to the indication information.

In embodiments of the present invention, when a UE is electrically powered on, notifying an eNB that the UE has a capability of supporting short latency service, and receiving reporting configuration information transmitted by the eNB; when an short latency service occurs and short latency data corresponding to the short latency service is generated, transmitting, by the UE, the short latency data to the eNB according to the reporting configuration information, or transmitting MAC CE to the eNB according to the reporting configuration information, where the MAC CE includes the short latency data. In this way, the UE with the short latency service does not need to access to a server in a network through an access process, but directly transmits short latency data to the eNB according to reporting configuration information, and thus can reduce the time delay during short latency data reporting.

Figure 9:
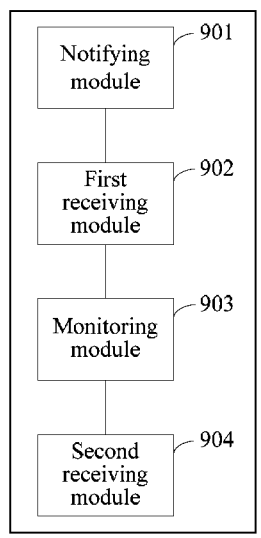
FIG. 9 is a schematic structural diagram of a device for receiving data transmission according to another embodiment of the present invention.

Referring to FIG. 9, embodiments of the present invention provide a device for receiving data transmission, including:

a notifying module 901, configured to notify an eNB that the UE has a capability of supporting short latency service, when a user equipment UE is electrically powered on;

a first receiving module 902, configured to receive monitoring configuration information transmitted by the eNB, after the notifying module 901 notifies the eNB that the UE has the capability of supporting short latency service;

a monitoring module 903, configured to monitor a common channel with the eNB in real time according to the monitoring configuration information received by the first receiving module 902;

a second receiving module 904, configured to receive the short latency data via the common channel, when the monitoring module 903 monitors that the eNB transmits short latency data corresponding to an short latency service via the common channel.

The notifying module 901 is specifically configured to transmit a UE identifier and indication information for indicating that the UE has the capability of supporting short latency service to the eNB, so that the eNB determines that the UE has the capability of supporting short latency service;

the first receiving module is specifically configured to receive an RRC connection reconfiguration message carrying the monitoring configuration information, transmitted by the eNB, where the reporting configuration information is an RNTI of the short latency service, configuration information for monitoring a paging channel or DRX parameter configuration information for monitoring the paging channel.

The monitoring module 903 is specifically configured to monitor in real time a PDCCH according to the RNTI of the short latency service, when the monitoring configuration information is the RNTI of the short latency service.

The second receiving module 904 includes:

a determining unit, configured to determine the short latency data corresponding to the short latency service transmitted by the eNB, when the monitoring module 903 monitors an RNTI of the short latency service transmitted by the eNB and a resource location of the short latency service via the PDCCH;

a receiving unit, configured to receive the short latency data corresponding to the short latency service transmitted by the eNB via a PDSCH with the eNB according to the resource location of the short latency service.

The monitoring module 903 is specifically configured to monitor in real time a paging channel with the eNB according to the configuration information for monitoring a paging channel or DRX parameter configuration information for monitoring the paging channel, when the monitoring configuration information is configuration information for monitoring the paging channel or DRX parameter configuration information for monitoring the paging channel.

The second receiving module 904 is specifically configured to receive a paging message via the paging channel, when the monitoring module 903 monitors the paging message carrying short latency data corresponding to the short latency service, transmitted by the eNB on the paging channel.

In embodiments of the present invention, when a UE is electrically powered on, the UE notifies an eNB that the UE has a capability of supporting short latency service, receives the monitoring configuration information transmitted by the eNB, and monitors the common channel with the eNB in real time according to the monitoring configuration information, when the eNB transmits short latency data corresponding to an short latency service via the common channel, the UE receives the short latency data via the common channel. Accordingly, when short latency data at a network side needs to be transmitted to the UE, the common channel is directly monitored according to the monitoring configuration information, which does not need to page the UE first and then the UE access to a server in a network through an access process, when the eNB transmitting short latency data via the common channel is monitored, the short latency data is received via the common channel, thus reducing the time delay during short latency data reception.

Figure 10:
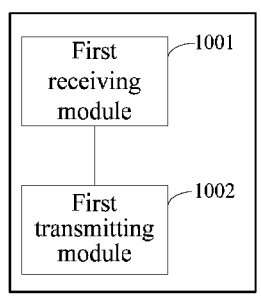
FIG. 10 is a schematic structural diagram of an eNB according to another embodiment of the present invention.

Referring to FIG. 10, the present invention provides an eNB, including:

a first receiving module 1001, configured to receive short latency data transmitted by a first UE via an RRC connection when the first UE generates short latency data corresponding to an short latency service, or receive MAC CE carrying the short latency data, transmitted by the first UE;

a first transmitting module 1002, configured to transmit the short latency data to the second UE via a common channel with the second UE received by the first receiving module 1001.

The first receiving module 1001 includes:

a first determining unit, configured to receive a first UE identifier transmitted by the first UE when the first UE is in an idle state, determine that the first UE has the capability of supporting short latency service according to a stored identifier list including the UE identifier of having the capability of supporting short latency service and the first UE identifier, and set up an SRB with the first UE;

a first receiving unit, configured to receive an RRC connection setup complete message carrying the short latency data transmitted by the first UE via the SRB set up by the first determining unit, and extract the short latency data from the RRC connection setup complete message according to the capability of supporting short latency service of the first UE.

The first receiving module 1001 includes:

a second determining unit, configured to receive a dedicated preamble corresponding to the short latency service transmitted by the first UE when the first UE is in an idle state, determine that the first UE has the capability of supporting short latency service according to the dedicated preamble, and transmit a TA and authentication scheduling information to the first UE;

a second receiving unit, configured to receive an short latency message carrying the short latency data transmitted by the first UE via an SRB0 with the first UE, after the second determining unit transmits the TA and the authentication scheduling information, and extract the short latency data from the short latency message according to the capability of supporting short latency service of the first UE.

The first receiving module 1001 includes:

a third determining unit, configured to receive a dedicated preamble corresponding to the short latency service transmitted by the first UE when the first UE is in an idle state, determine that the first UE has the capability of supporting short latency service according to the dedicated preamble, and transmit a TA and authentication scheduling information to the first UE;

a third receiving unit, configured to receive an RRC connection request message carrying the short latency data transmitted by the first UE via an SRB0 with the first UE after the third determining unit transmits the TA and the authentication scheduling information, and extract the short latency data from the RRC connection request message according to the capability of supporting short latency service of the first UE.

The first receiving module 1001 includes:

a fourth receiving unit, configured to receive a dedicated preamble corresponding to the short latency service transmitted by the first UE when the first UE is in an idle state, determine that the first UE has the capability of supporting short latency service according to the dedicated preamble, transmit a TA and authentication scheduling information to the first UE, receive MAC CE carrying the short latency data transmitted by the first UE, and extract the short latency data from the MAC CE according to the capability of supporting short latency service of the first UE;

a fifth receiving unit, specifically configured to receive the MAC CE carrying indication information and the short latency data transmitted by the first UE when the first UE is in a connected state, and extract the short latency data from the MAC CE according to an indication of the indication information.

The first receiving module 1001 includes:

a sixth receiving unit, configured to receive an uplink transmission message carrying indication information and the short latency data transmitted by the first UE via the SRB with the first UE when the first UE is in a connected state, and extract the short latency data from the uplink transmission message according to an indication of the indication information; or a seventh receiving unit, configured to receive an uplink data packet carrying indication information and the short latency data transmitted by the first UE via a DRB with the first UE when the first UE is in a connected state, and extract the short latency data from the uplink data packet according to an indication of the indication information; or an eighth receiving unit, configured to receive the short latency data transmitted by the first UE via an short latency DRB corresponding to the short latency service when the first UE is in a connected state.

The first transmitting module 1002 includes:

a transmitting unit, configured to transmit an RNTI of the short latency service and a resource location of the short latency service via a PDCCH with the second UE, and transmit the short latency data via a PDSCH with the second UE according to the resource location of the short latency service; or a paging unit, configured to transmit a paging message carrying the short latency data to the second UE via a paging channel with the second UE.

Further, the eNB also includes:

a second receiving module, configured to transmit an attach request message carrying indication information for indicating that the UE has the capability of supporting short latency service to an MME, receive an initial context setup request message carrying indication information for indicating that the UE has the capability of supporting short latency service transmitted by the MME;

a second transmitting module, configured to determine that the UE has the capability of supporting short latency service according to the indication information, transmit an RRC connection reconfiguration message carrying reporting configuration information and monitoring configuration information to the UE;

wherein the reporting configuration information includes a service flow template corresponding to the short latency service, a dedicated preamble and/or short latency DRB configuration information, and the monitoring configuration information includes an RNTI of the short latency service, configuration information for monitoring a paging channel or DRX parameter configuration information for monitoring the paging channel.

All or a part of the technical solutions provided by the above embodiments can be implemented by software programming, the software program is stored in a readable storage medium, such as a hard disk, an optical disk or a floppy disk of the computer. The embodiments described above are merely preferred embodiments of the present invention and they do not limit the present invention. Any modification, equal replacement and development within the spirit and principle of the present invention are included in the protection scope of the present invention.

What is claimed is:

1. A method for reporting data transmission, comprising:
   when a user equipment (UE) is powered on, transmitting, by the UE, a UE identifier and indication information for indicating that the UE is capable of supporting an emergency service to a Mobility Management Entity (MME), to facilitate the MME transmitting, to an evolved Node B (eNB), the UE identifier, the indication information and a service flow template corresponding to the emergency service comprising an indication for the UE to transmit emergency data corresponding to the emergency service via a signaling radio bearer (SRB) with the eNB and to facilitate the eNB determining that the UE is capable of supporting the emergency service according to the indication information, storing the UE identifier in an identifier list and transmitting reporting configuration information to the UE;

receiving, by the UE, the reporting configuration information from the eNB; and when the emergency service occurs and the emergency data corresponding to the emergency service is generated by the UE, transmitting, by the UE, the emergency data to the eNB according to the reporting configuration information, wherein the reporting configuration information comprises the service flow template corresponding to the emergency service.

2. The method according to claim 1, wherein the receiving comprises:
   receiving a radio resource control protocol (RRC) connection reconfiguration message carrying the reporting configuration information from the eNB, wherein the reporting configuration information comprises the service flow template corresponding to the emergency service and/or a dedicated preamble corresponding to the emergency service.

3. The method according to claim 1, wherein the transmitting comprises:
   when the UE is in an idle state, and the reporting configuration information comprises the service flow template corresponding to the emergency service, determining that the emergency data is to be transmitted via the SRB with the eNB;
   transmitting the UE identifier to the eNB, and setting up the SRB with the eNB; and
   transmitting a radio resource control protocol (RRC) connection setup complete message carrying the emergency data to the eNB via the SRB.

4. The method according to claim 1, wherein the transmitting comprises:
   when the UE is in an idle state, and the reporting configuration information comprises the service flow template corresponding to the emergency service and a dedicated preamble corresponding to the emergency service, determining that the emergency data is to be transmitted via the SRB with the eNB according to the indication of the service flow template corresponding to the emergency service;
   transmitting the dedicated preamble corresponding to the emergency service to the eNB, and receiving a timing advance (TA) and authentication scheduling information transmitted by the eNB; and
   transmitting emergency information carrying the emergency data to the eNB via an SRB0 with the eNB.

5. The method according to claim 1, wherein the emergency data is transmitted to the eNB as part of medium access control layer control elements (MAC CE) transmitted to the eNB, and wherein transmitting the MAC CE to the eNB comprises:
   when the UE is in a connected state, transmitting MAC CE carrying indication information and the emergency data to the eNB.

6. A user equipment (UE) for reporting data transmission, comprising:
   a processor, configured to, when the UE is powered on, determine to transmit a UE identifier and indication information for indicating that the UE is capable of supporting an emergency service to a Mobility Management Entity (MME), to facilitate the MME transmitting, to an evolved Node B (eNB), the UE identifier, the indication information and a service flow template corresponding to the emergency service comprising an indication for the UE to transmit emergency data corresponding to the emergency service via a signaling radio bearer (SRB) with the eNB and to facilitate the eNB determining that the UE is capable of supporting the emergency service according to the indication information, storing the UE identifier in an identifier list and transmitting reporting configuration information to the UE;

a receiver, configured to receive the reporting configuration information from the eNB; and a transmitter, configured to, when the emergency service occurs and the emergency data corresponding to the emergency service is generated by the UE, transmit the emergency data to the eNB according to the reporting configuration information received by the receiver, wherein the reporting configuration information comprises the service flow template corresponding to the emergency service.

7. The UE according to claim 6, wherein receiving the reporting configuration information from the eNB further comprises:

receiving a radio resource control protocol (RRC) connection reconfiguration message carrying the reporting configuration information from the eNB, wherein the reporting configuration information comprises the service flow template corresponding to the emergency service and/or a dedicated preamble corresponding to the emergency service.

8. The UE according to claim 6, wherein the processor is further configured to:

determine, when the UE is in an idle state and the reporting configuration information comprises the service flow template corresponding to the emergency service, that the emergency data is to be transmitted via the SRB with the eNB;

determine to transmit the UE identifier to the eNB and set up the SRB with the eNB; and determine to transmit a radio resource control protocol (RRC) connection setup complete message carrying the emergency data to the eNB via the SRB.

9. A non-transitory computer-readable medium having processor-executable instructions stored thereon, wherein the processor-executable instructions, when executed, facilitate performance of the following:

when a user equipment (UE) is powered on, transmitting a UE identifier and indication information for indicating that the UE is capable of supporting an emergency service to a Mobility Management Entity (MME), to facilitate the MME transmitting, to an evolved Node B (eNB), the UE identifier, the indication information and a service flow template corresponding to the emergency service comprising an indication for the UE to transmit emergency data corresponding to the emergency service via a signaling radio bearer (SRB) with the eNB and to facilitate the eNB determining that the UE is capable of supporting the emergency service according to the indication information, storing the UE identifier in an identifier list and transmitting reporting configuration information to the UE;

receiving the reporting configuration information from the eNB; and when the emergency service occurs and the emergency data corresponding to the emergency service is generated by the UE, transmitting the emergency data to the eNB according to the reporting configuration information, wherein the reporting configuration information comprises the service flow template corresponding to the emergency service.

* * * * *